US012264511B2

(12) United States Patent
Debroucke et al.

(10) Patent No.: US 12,264,511 B2
(45) Date of Patent: Apr. 1, 2025

(54) ADJUSTABLE STRIKER FOR A VEHICLE AND METHOD FOR ADJUSTING THE ADJUSTABLE STRIKER

(71) Applicant: U-SHIN FRANCE, Alfortville (FR)

(72) Inventors: François Debroucke, Abbeville (FR); Benoit Franke, Abbeville (FR)

(73) Assignee: U-SHIN FRANCE, Alfortville (FR)

(*) Notice: Subject to any disclaimer, the term of this patent is extended or adjusted under 35 U.S.C. 154(b) by 134 days.

(21) Appl. No.: 18/101,878

(22) Filed: Jan. 26, 2023

(65) Prior Publication Data

US 2023/0235600 A1 Jul. 27, 2023

(30) Foreign Application Priority Data

Jan. 27, 2022 (EP) .................................... 22153562

(51) Int. Cl.
*E05B 79/02* (2014.01)
*E05B 15/02* (2006.01)
*E05B 85/04* (2014.01)

(52) U.S. Cl.
CPC .............. *E05B 79/02* (2013.01); *E05B 85/04* (2013.01); *E05B 85/045* (2013.01); *E05B 15/024* (2013.01); *E05B 15/025* (2013.01)

(58) Field of Classification Search
CPC ........ E05B 79/02; E05B 85/045; E05B 85/04; E05B 15/024; E05B 15/025; E05B 15/0255; E05B 15/022; F16B 5/0225; F16B 5/02; F16B 41/002; B62D 25/04
See application file for complete search history.

(56) References Cited

U.S. PATENT DOCUMENTS 4,573,733 A * 3/1986 Zaydel .................. F16B 5/0258 411/908
5,093,976 A * 3/1992 Malinow ................. F16B 37/00 29/523
11,480,209 B2 * 10/2022 Forti ...................... B60J 5/0433
(Continued)

FOREIGN PATENT DOCUMENTS

DE 4401071 C1 * 4/1995 ................ B60J 5/00
DE 19907373 A1 * 8/2000 ........... E05B 15/024
(Continued)

OTHER PUBLICATIONS

European Search Report issued in corresponding EP Application 22153562, completed Jun. 29, 2022.

*Primary Examiner* — Christine M Mills
*Assistant Examiner* — Faria F Ahmad
(74) *Attorney, Agent, or Firm* — Burris Law, PLLC

(57) ABSTRACT

A striker includes a striker pad, a wire, a securing element, and a deformable spacer. The securing element exerts a securing force. The spacer includes a first end that receives the securing force and a second end that contacts the vehicle body. The spacer creates a clearance between the striker pad and the vehicle body when a first torque value is applied to the securing element so that the striker pad is movable along a first axis through a force exerted by the latch of a vehicle door, the latch cooperating with the wire when closing the door. The spacer is configured to deform to allow contact between the striker pad and the vehicle body when a second torque value is applied to the securing element.

15 Claims, 4 Drawing Sheets

(56) References Cited

U.S. PATENT DOCUMENTS

| | | | | |
|---|---|---|---|---|
| 2008/0116700 | A1* | 5/2008 | Snyder | E05B 85/045 292/341.12 |
| 2012/0086224 | A1* | 4/2012 | Novajovsky | E05B 85/045 292/341.18 |
| 2014/0008939 | A1* | 1/2014 | Olivieri | E05B 15/025 296/202 |
| 2014/0053388 | A1* | 2/2014 | Mazzei | E05B 85/045 29/464 |
| 2015/0247348 | A1* | 9/2015 | Krishnan | E05B 85/045 292/341.18 |
| 2016/0257350 | A1* | 9/2016 | Morris | F16B 33/006 |
| 2018/0222294 | A1* | 8/2018 | Cumbo | E05B 85/02 |
| 2018/0305959 | A1* | 10/2018 | Abbott | B60J 5/0479 |
| 2018/0320418 | A1* | 11/2018 | Berghahn | E05B 83/18 |
| 2020/0291980 | A1* | 9/2020 | Forti | B60J 5/0433 |
| 2020/0392765 | A1* | 12/2020 | Townson | E05B 85/045 |
| 2020/0392766 | A1* | 12/2020 | Marshall | E05B 83/36 |
| 2021/0254367 | A1* | 8/2021 | Bodechon | E05B 47/0038 |
| 2024/0110413 | A1* | 4/2024 | Debroucke | E05B 77/10 |
| 2024/0229521 | A1* | 7/2024 | Welch | E05B 77/02 |

FOREIGN PATENT DOCUMENTS

| | | | | | |
|---|---|---|---|---|---|
| DE | 102009018582 | A1 | | 11/2009 | |
| DE | 102010049345 | A1 | * | 4/2012 | E05B 77/42 |
| DE | 102011122048 | A1 | * | 6/2013 | E05B 77/10 |
| DE | 202018106887 | U1 | * | 2/2019 | E05B 15/022 |
| EP | 3708397 | A1 | * | 9/2020 | B60J 5/0431 |
| FR | 2966486 | A1 | * | 4/2012 | E05B 17/0062 |
| FR | 2982572 | A1 | | 5/2013 | |
| FR | 3084902 | A1 | | 2/2020 | |
| KR | 20090095319 | A | * | 9/2009 | |
| KR | 20100019612 | A | * | 2/2010 | |
| WO | 2008074270 | A2 | | 6/2008 | |

* cited by examiner

ADJUSTABLE STRIKER FOR A VEHICLE AND METHOD FOR ADJUSTING THE ADJUSTABLE STRIKER

CROSS-REFERENCE TO RELATED APPLICATIONS

This application claims priority to and the benefit of European Application No. 22153562.8 filed on Jan. 27, 2022. The disclosures of the above applications are incorporated herein by reference.

FIELD

The present disclosure relates to an adjustable striker for a vehicle, and a method for adjusting the adjustable striker. More specifically, the present disclosure concerns a self-adjustable striker.

BACKGROUND

The statements in this section merely provide background information related to the present disclosure and may not constitute prior art.

A striker is a static part attached to the vehicle body and configured to attach a latch of a door to the vehicle body.

Usually, a striker includes a metal plate including a wire configured to cooperate with the latch in order to create resistance between the door and the vehicle body, to keep the door in a closed position while driving or during a crash. The cooperation of the striker and the latch contributes to a complete rigid structure of the vehicle.

Generally, when a striker is assembled on the vehicle body, the wire needs to be adjusted in height, i.e., along an axis perpendicular to the direction of closing of the door (Z direction), and/or in width, i.e., along an axis parallel to the direction of closing of the door (Y direction), relative to the vehicle. Indeed, as the latch cooperates with the wire in order to attach the door to the vehicle body in the closed position, if the wire is wrongly positioned, the door will be wrongly positioned. More precisely, regarding adjustment in the Z direction, if the wire is too far up or too far down, the door will be too far up or too far down, and a gap between the vehicle body and the door will be visible. Regarding the Y direction, if the wire is misplaced, the door will not be aligned with the vehicle body (not flush), and depression of air and noise will occur.

It is known to manage the position of the striker by manually acting on the striker with a hammer, when the door is in an open position. More precisely, a plastic plate is inserted between the metal plate and the vehicle body, and the striker is fixed to the vehicle body by screws. To adjust the position of the striker, the screws are loosened so that an operator can adjust the striker using the hammer when the door is in the open position, to move the striker in the Z direction and/or Y direction. Then the operator closes the door to check the position of the door relative to the vehicle body. The operator repeats these steps as often as necessary before tightening the screws.

Alternatively, it is known to manage the position of the striker by manually acting on screws used to fix the striker to the vehicle body, when the door is in an open position. More precisely, to adjust the position of the striker, an operator opens the door and adjusts the screws to move the striker in the Z direction and/or Y direction, and then closes the door to check the position of the door relative to the vehicle body.

These adjustment methods require multiple door openings and closings and take time.

There is room for improvement in the field of striker position adjustment, in order to save time.

SUMMARY

This section provides a general summary of the disclosure and is not a comprehensive disclosure of its full scope or all of its features.

An object of the present disclosure is to provide a striker for a vehicle, which striker is self-adjustable.

The object is achieved by a striker, according to one form of the present disclosure, that is configured to be secured to a vehicle body and to cooperate with a latch attached to a door of the motor vehicle. The door is movable relative to the body in a direction of closing and a direction of opening. The striker includes a striker pad, a securing element, and a spacer. The striker pad includes a wire protruding from the striker pad. The securing element is configured to exert a securing force to secure the striker pad to the vehicle body when a torque is applied to the securing element. The spacer is deformable and includes a first end configured to receive the securing force from the securing element, and a second end configured to be in contact with the vehicle body. The spacer is configured to create a clearance between the striker pad and the vehicle body when a first torque value is applied to the securing element so that the striker pad is movable with respect to the vehicle body along a first axis perpendicular to the direction of closing through a force exerted by the latch cooperating with the wire when closing the door. The spacer is configured to be deformed such as to allow a contact between the striker pad and the vehicle body when a second torque value higher than the first torque value is applied to the securing element thereby preventing a movement of the striker pad with respect to the vehicle body.

By the provision of a striker which includes a deformable spacer, adjustment of the striker position can be performed automatically when closing the door and does not require multiple openings and closings of the door. Therefore, the striker of the present disclosure saves time when adjusting the position of the striker, especially if the door is an automatic door where opening/closing takes longer than for manual doors.

According to one form, the striker pad includes an aperture and the spacer is disposed in the aperture and includes a diameter smaller than the diameter of the aperture.

According to one form, the striker includes a sleeve disposed in contact with the striker pad and with the spacer, the spacer being configured to receive the securing force via the sleeve.

According to one form, the striker includes a first guide configured to guide movement of the striker pad along the first axis.

According to one form, the first guide includes a first rail cooperating with the sleeve.

According to one form, the spacer allows the striker pad to be movable with respect to the vehicle body along a second axis perpendicular to the first axis through a force exerted on the door in the direction of closing. Hereby, the striker of the present disclosure can be adjusted along two perpendicular axes (in height and width) in a single operation.

According to one form, the striker includes a second guide configured to guide movement of the striker pad along the second axis.

According to one form, the second guide includes a second rail cooperating with the wire.

According to one form, the striker includes a return blocking device configured to forbid a return movement of the striker pad along the second axis after movement of the striker pad along the second axis through the force exerted on the door in the direction of closing.

According to one form, the striker includes a reset device configured to cooperate with the return blocking device in order to allow a return movement of the striker pad along the second axis in the direction of opening, after movement of the striker pad along the second axis through the force exerted on the door in the direction of closing.

According to one form, the striker includes a removable stopper configured to block movement of the striker pad along the second axis.

The object is further achieved by a method according to yet another form of the present disclosure which includes securing the striker pad to the vehicle body with the first torque value, closing the door such that the latch cooperates with the wire and moves the striker pad along the first axis in order to center the wire with the latch, opening the door, and securing the striker pad to the vehicle body with the second torque value.

According to yet another form of the present disclosure, a method includes securing the striker pad to the vehicle body with the first torque value, closing the door such that the latch cooperates with the wire and moves the striker pad along the first axis in order to center the wire with the latch, pushing on the latch in the direction of closing such that the striker pad moves along the second axis in order to adjust flushness of the door, opening the door, and securing the striker pad to the vehicle body with the second torque value.

The term "closing the door" means to close the door such that the latch is fully attached to the striker.

According to still another form of the present disclosure, a method includes securing the striker pad to the vehicle body with the first torque value, closing the door such that the latch cooperates with the wire and moves the striker pad along the first axis in order to center the wire with the latch, removing the removable stopper, pushing on the latch in the direction of closing such that the striker pad moves along the second axis in order to adjust flushness of the door, opening the door, and securing the striker pad to the vehicle body with the second torque value.

The object is further achieved by a vehicle, according to a further form of the present disclosure, which includes the striker as described in any of the above paragraphs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
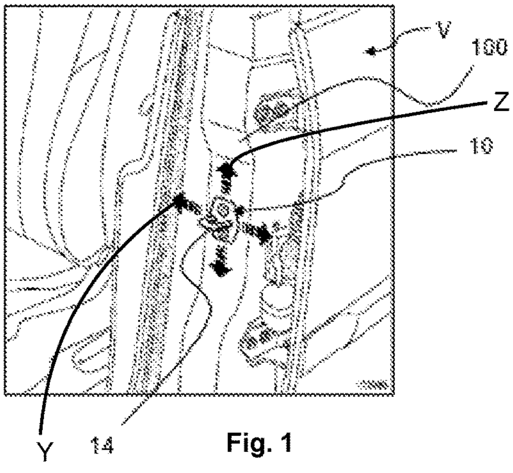
FIG. 1 is a schematic perspective view of a vehicle body including a striker according to the teachings of the present disclosure.
Figure 2:
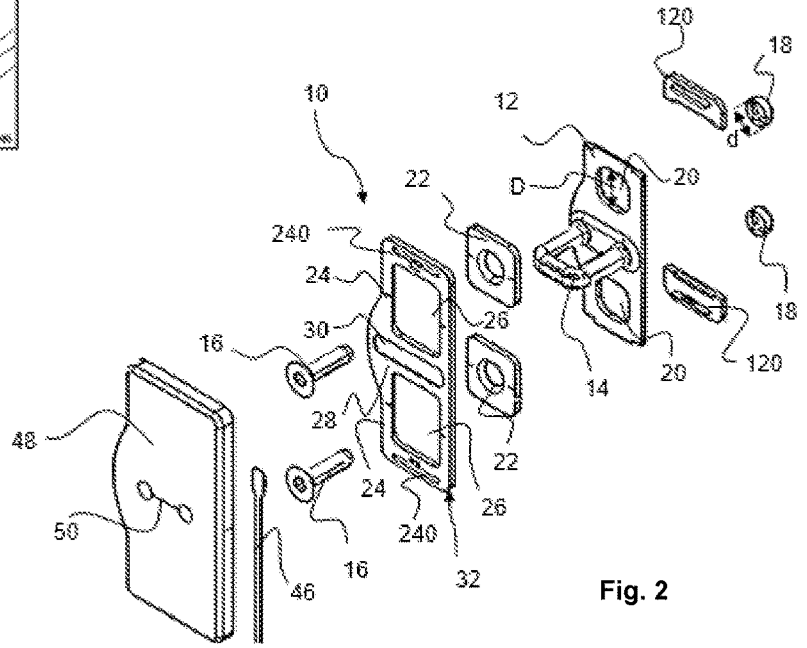
FIG. 2 is an exploded view of the striker of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a vehicle body 100 of a vehicle V, the vehicle body 100 including a striker 10 according to the teachings of the present disclosure. The vehicle body 100 can be a pillar of the vehicle.

Figure 8:
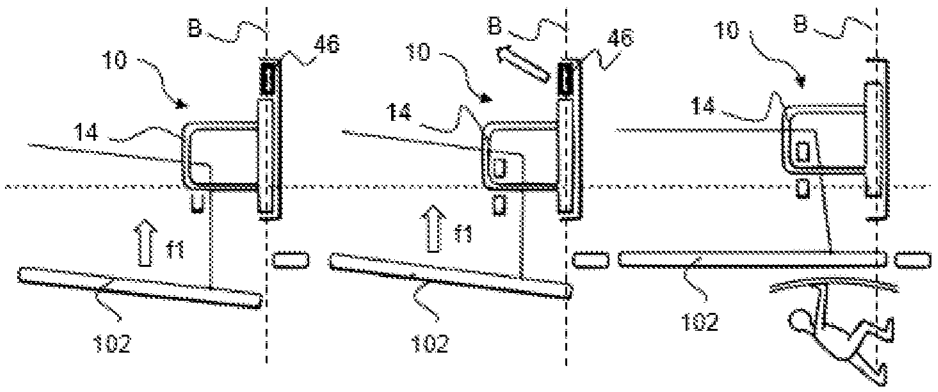
FIG. 8 is a series of schematic cross-sectional views illustrating a method for adjusting the striker of FIG. 1, according to the teachings of the present disclosure.

The striker 10 is an adjustable striker. The striker 10 is, more precisely, an auto-adjustable striker. The striker 10 is configured to cooperate with a latch (not represented) attached to a door 102 (FIGS. 3 and 8) of the vehicle V. The door 102 is movable relative to the vehicle body 100 in a direction of closing "f1" (FIG. 8) and a direction of opening "f2". The direction of opening "f2" is opposite to the direction of closing "f1".

As illustrated in FIGS. 1 to 12, the striker 10 includes a striker pad 12. The striker pad 12 is configured to be secured to the vehicle body 100. The striker 10 includes a wire 14 protruding from the striker pad 12. The wire 14 can extend in a plane perpendicular to the striker pad 12. The wire 14 is configured to cooperate with the latch of the door 102.

The striker 10 includes a securing element 16 configured to exert a securing force to secure the striker pad 12 to the vehicle body 100 when a torque is applied to the securing element 16. The securing element 16 can be a screw.

The striker 10 includes a spacer 18 configured to create a clearance G (FIGS. 4 and 5) between the striker pad 12 and the vehicle body 100 when a first torque value is applied to the securing element 16. When the first torque value is applied to the securing element 16, the spacer 18 allows the striker pad 12 to move with respect to the vehicle body 100, through a force exerted by the door 102, when closing the door 102. The spacer 18 allows the striker pad 12 to move with respect to the vehicle body 100, through a force exerted by the latch cooperating with the striker 10 when closing the door 102. The spacer 18 allows the striker pad 12 to move with respect to the vehicle body 100, through a force exerted by the latch cooperating with the wire 14 when closing the door 102.

In one form, the first torque value can be about 1 Nm. The first torque value allows to have no added friction during adjustment of the striker 10.

The spacer 18 is configured to receive the securing force from the securing element 16. The spacer 18 includes a first end 18A (FIGS. 4 and 5) configured to receive the securing force from the securing element 16, and a second end 18B (FIGS. 4 and 5) configured to be in contact with the vehicle body 100. The spacer 18 is fixed relative to the vehicle body 100.

The spacer 18 is deformable. The spacer 18 allows contact between the striker pad 12 and the vehicle body 100 when a second torque value is applied to the securing element 16, thereby preventing movement of the striker pad 12 with respect to the vehicle body 100. The spacer 18 can be contracted under the effect of the second torque value. The second torque value aims to ensure the striker 10 is fixedly attached to the vehicle body 100. Therefore, when the door 102 is in a closed position, the door 102 is attached to the vehicle body 100 without any movement relative to the vehicle body 100.

The spacer 18 allows the striker pad 12 to be movable with respect to the vehicle body 100 at least along a first axis A (FIG. 5) perpendicular to the direction of closing "f1". The spacer 18 is movable along the first axis A (FIG. 5) through a force exerted by the latch cooperating with the wire 14, when closing the door 102. The first axis A (FIG. 5) can be a vertical axis.

Figure 4:
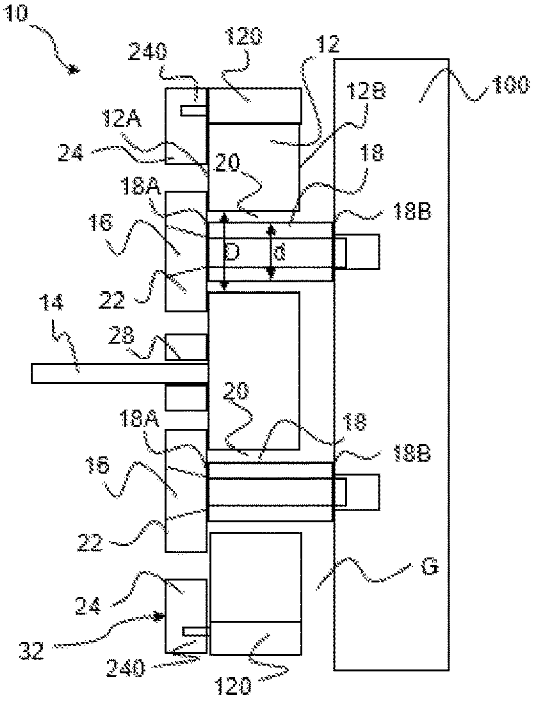
FIG. 4 is a schematic longitudinal cross-sectional view of the striker of FIG. 1, taken along a plane perpendicular to a striker pad of the striker, when a first torque value is applied to secure the striker.
Figure 5:
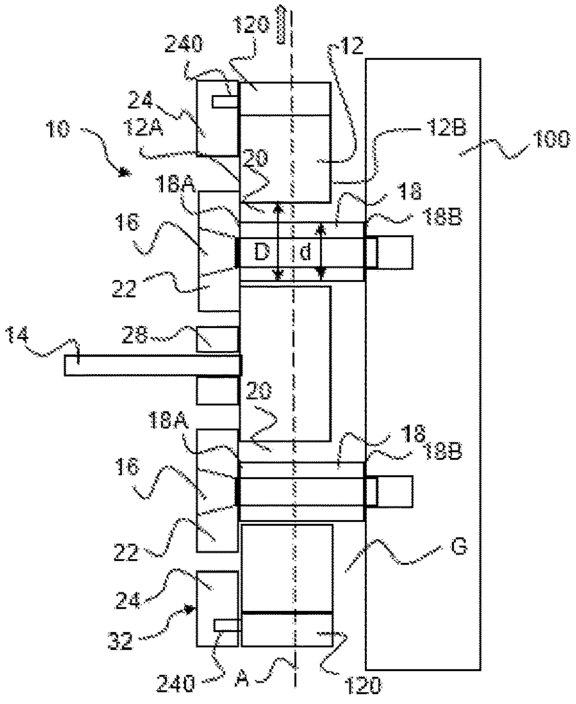
FIG. 5 is a schematic longitudinal cross-sectional view similar to FIG. 4, showing a possible adjustment of the striker in accordance with the teachings of the present disclosure.
Figure 6:
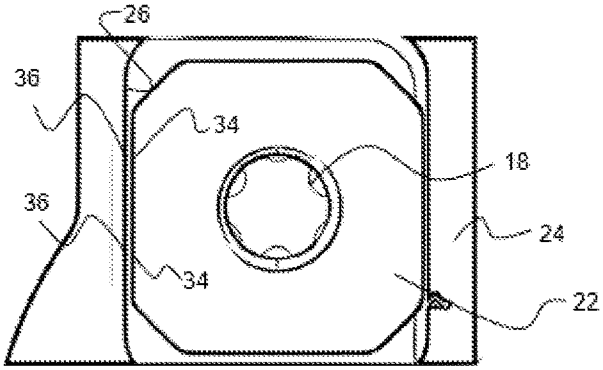
FIG. 6 is a longitudinal cross-sectional view of a portion of the striker of FIG. 1, taken along a plane parallel to the striker pad of the striker.
Figure 7:
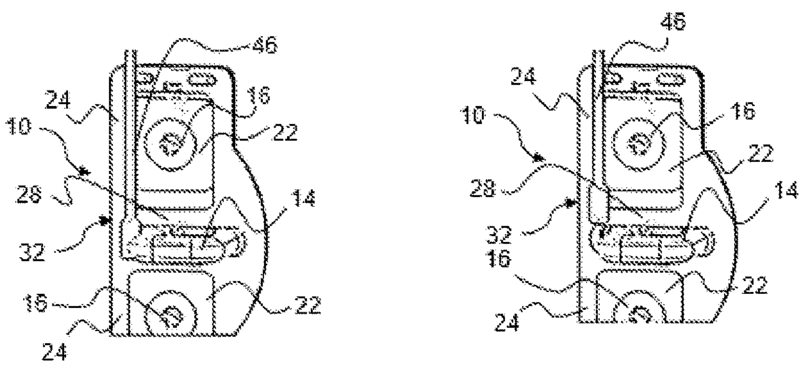
FIG. 7 is a series of front views illustrating a step of a method for adjusting the striker of FIG. 1, according to the teachings of the present disclosure.

The striker pad 12 can include an aperture 20. The aperture 20 can be configured to receive the spacer 18. As illustrated in FIGS. 4 and 5, the spacer 18 can be disposed in the aperture 20. For example, the spacer 18 crosses the aperture 20. The spacer 18 can have a diameter "d" smaller than the diameter "D" of the aperture 20. The striker 10 can define a gap between the perimeter of the spacer 18 and the wall of the aperture 20.

In one form, the diameter "d" of the spacer 18 can be about 10.5 mm. In one form, the spacer 18 can have a length of about 3.4 mm.

The striker pad 12 can include a first end 12A configured to be flush with the first end 18A of the spacer 18, and a second end 12B configured to be in contact with the vehicle body 100 when the second torque value is applied to the securing element 16. The second end 18B of the spacer 18 can be configured to protrude from the second end 12B of the striker pad 12 when the first torque value is applied to the securing element 16.

The striker 10 can include a sleeve 22 disposed in contact with the striker pad 12 and with the spacer 18. The spacer 18 can be configured to receive the securing force via the sleeve 22. The sleeve 22 can be configured to receive the securing force from the securing element 16. The sleeve 22 can include a wall disposed in contact with the first end 18A of the spacer 18. The sleeve 22 can be fixed relative to the vehicle body 100.

The striker 10 can include a first guide 24 configured to guide movement of the striker pad 12 along the first axis A. The first guide 24 can include a first rail 26 configured to cooperate with the sleeve 22. For example, the first guide 24 can be a plate, and the first rail 26 can define an opening in the first guide 24. The first guide 24 can be configured to slide along the sleeve 22. The first guide 24 can be configured to slide along the first axis A. The striker pad 12 can slide along the first axis A with the first guide 24.

The first rail 26 define a rectangular opening in the plate. The sleeve 22 can be a square inserted in the opening defined by the first rail 26. The sleeve 22 can have two opposite sides in contact with two opposite sides of the first rail 26. The opposite sides can be parallel to the first axis A.

The first guide 24 can define a notch 240 cooperating with a complementary element 120 fastened to the striker pad 12. The complementary element 120 can be integral with the striker pad 12. The first guide 24 can be attached to the striker pad 12.

The spacer 18 can allow the striker pad 12 to be movable with respect to the vehicle body 100 along a second axis B (FIG. 8) parallel to the direction of closing "f1". The second axis B can be perpendicular to the first axis A. The spacer 18 can be movable along the second axis B through a force exerted by the latch cooperating with the wire 14, when closing the door 102. The second axis B can be horizontal.

The striker 10 can be configured to cooperate with a latch defining a first and a second notch. The latch can be movable between an open position, a closed position at the first notch, and a closed position at the second notch.

The striker 10 can include a second guide 28 configured to guide movement of the striker pad 12 along the second axis B. The second guide 28 can include a second rail 30 configured to cooperate with the wire 14. For example, the second guide 28 can be a plate, and the second rail 30 can define an opening in the plate. The wire 14 can be configured to slide along the second guide 28. The wire 14 can be configured to slide along the second rail 30. The second rail 30 can extend along the second axis B. The wire 14 can be configured to slide along the second axis B. The striker pad 12 can be configured to slide along the second axis B. The striker pad 12 can be configured to be movable relative to the second guide 28, along the second axis B. The second guide 28 can be fixed with respect to the vehicle body 100, along the second axis B.

The second rail 30 can have a length greater than the length of the wire 14. The wire 14 can slide inside the second rail 30.

The second guide 28 can be fastened to the first guide 24. The second guide 28 can be integral with the first guide 24. The first guide 24 and the second guide 28 can form a guiding plate 32. The guiding plate 32 can be movable relative to the sleeve 22 along the first axis A. The notch 240 cooperating with the complementary element 120 can allow movement of the striker pad 12 relative to the guiding plate 32, along the second axis B. The sleeve 22 can maintain the guiding plate 32 fixed relative to the second axis B.

The sleeve 22 can define at least one notch 34 (FIG. 6) disposed at least at one of the two opposite sides. The first rail 26 can include a complementary element 36 cooperating with the at least one notch 34. The at least one notch 34 and the complementary element 36 can allow the first guide 24 and the striker pad 12 to resist gravity force.

The striker 10 can include a return blocking device 38 (FIGS. 11 and 12) configured to forbid a return movement of the striker pad 12 along the second axis B, after movement of the striker pad 12 along the second axis B through the force exerted on the door 102 in the direction of closing "f1". The return blocking device 38 can be configured to forbid a movement of the striker pad 12 along the second axis B in the direction of opening "f2". The return blocking device 38 can be configured to authorize movement of the striker pad 12 along the second axis B through the force exerted on the door 102 in the direction of closing "f1". The return blocking device 38 can be configured to authorize movement of the striker pad 12 along the second axis B in the direction of closing “f1”.

The return blocking device 38 can be a toothed element configured to cooperate with the striker pad 12. The return blocking device 38 can include a thin portion 380 configured to bend through the force exerted on the door 102 in the direction of closing 11".

The striker 10 can include a reset device 40 configured to cooperate with the return blocking device 38 in order to allow a return movement of the striker pad 12 along the second axis B after movement of the striker pad 12 along the second axis B through the force exerted on the door 102 in the direction of closing “f1”. The reset device 40 can be configured to cooperate with the return blocking device 38 in order to allow a movement of the striker pad 12 along the second axis B in the direction of opening “f2”.

The reset device 40 can include a protrusion 42 configured to cooperate with the return blocking device in order to allow a movement of the striker pad 12 along the second axis B in the direction of opening “f2”.

The reset device 40 can include a wall 44 configured to drive the wire 14 in the direction of opening “f2”.

The striker 10 can include a removable stopper 46 configured to block movement of the striker pad 12 along the second axis B. The removable stopper 46 can be inserted in the second rail 30. The removable stopper 46 can fill in the extra length of the second rail 30 relative to the wire 14.

The striker 10 can include a cover 48 configured to cover the striker pad 12 for protection and to manage aesthetical aspects. The cover 48 can be configured to cover the guiding plate 32. The wire 14 can be configured to protrude from the cover 48. The cover 48 can include a slot 50 configured to receive the wire 14. The cover 48 can be made of plastic.

The striker pad 12 and the wire 14 can be made of metal. The sleeve 22 can be made of metal. The first guide 24 and the second guide 28 can be made of metal. The spacer 18 can be made of plastic, for example POM (polyoxyméthylène).

The striker 10 can include two spacers 18. The striker 10 can include two securing elements 16 configured to exert a securing force to secure the striker pad 12 to the vehicle body 100. Each spacer 18 can be configured to receive the securing force from each securing element 16.

The striker pad 12 can define two apertures 20. Each aperture 20 can be configured to receive one of each spacer 18.

The striker 10 can include two sleeves 22. Each sleeve 22 can be disposed in contact with the striker pad 12 and with one of each spacer 18. Each sleeve 22 can be configured to receive the securing force from each securing element 16.

The striker 10 can include two first guides 24 configured to guide movement of the striker pad 12 along the first axis A. Each first guide 24 can include a first rail 26 configured to cooperate with each sleeve 22. Each first guide 24 can define a notch 240 cooperating with a complementary element 120 fastened to the striker pad 12. The striker pad 12 can include two complementary elements 120.

The second guide 28 can be fastened to each first guide 24. The second guide 28 can be integral with each first guide 24. The two first guides 24 and the second guide 28 can form the guiding plate 32.

The striker 10 can include two return blocking devices 38 configured to forbid a return movement of the striker pad 12 along the second axis B, after movement of the striker pad 12 along the second axis B through the force exerted on the door 102 in the direction of closing “f1”.

Figure 9:
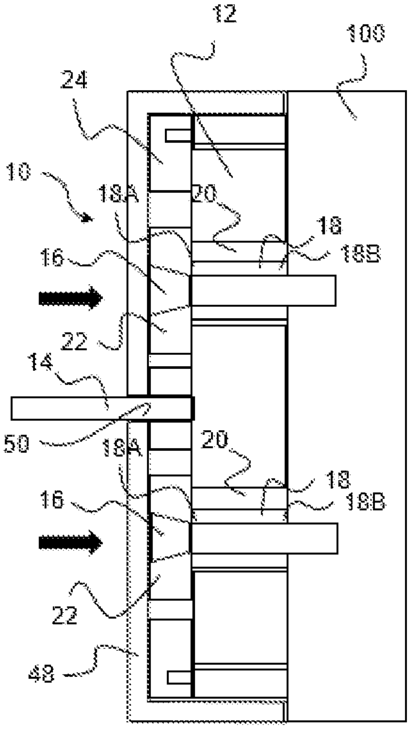
FIG. 9 is a schematic longitudinal cross-sectional view similar to FIG. 4, illustrating the striker after adjustment.
Figure 10:
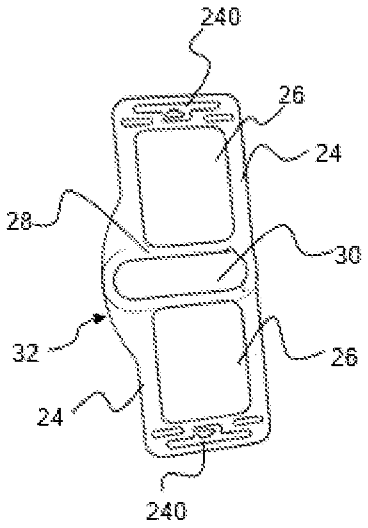
FIG. 10 is a front view of a part of the striker of FIG. 1.
Figure 11:
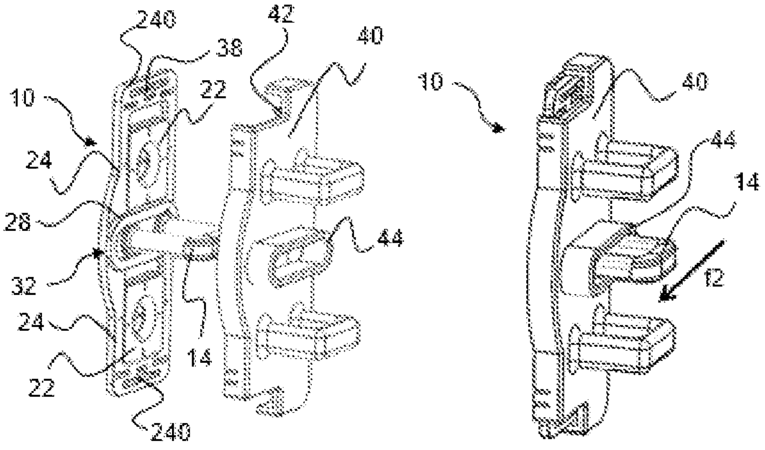
FIG. 11 is an exploded perspective view of a portion of another striker according to the teachings of the present disclosure.
Figure 12:
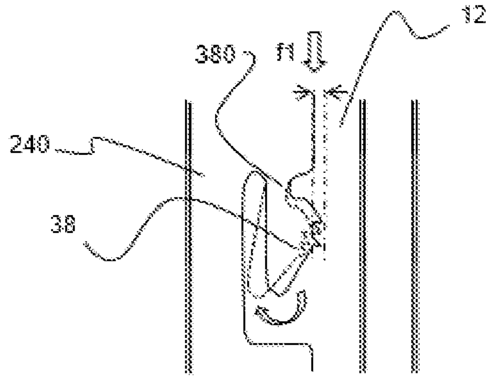
FIG. 12 is a schematic cross-sectional view of a detail of a striker according to the teachings of the present disclosure.

The method for adjusting the striker 10 includes the following steps:

a) securing the striker pad 12 to the vehicle body 100 with the first torque value (4), b) closing the door 102 such that the latch cooperates with the wire 14 and moves the striker pad 12 along the first axis A in order to center the wire 14 with the latch (FIG. 5), c) opening the door 102, and d) securing the striker pad 12 to the vehicle body 100 with the second torque value (FIG. 9).

After step b) of closing the door 102, the method can include the following step:

b') pushing on the latch in the direction of closing “f2” such that the striker pad 12 moves along the second axis B in order to adjust flushness of the door 102.

More precisely, the latch can be pushed on to the second notch.

Before step b') of pushing on the latch in the direction of closing “f2” such that the striker pad 12 moves along the second axis B in order to adjust flushness of the door 102, the method can include the following step:

b") removing the removable stopper 46.

Figure 3:
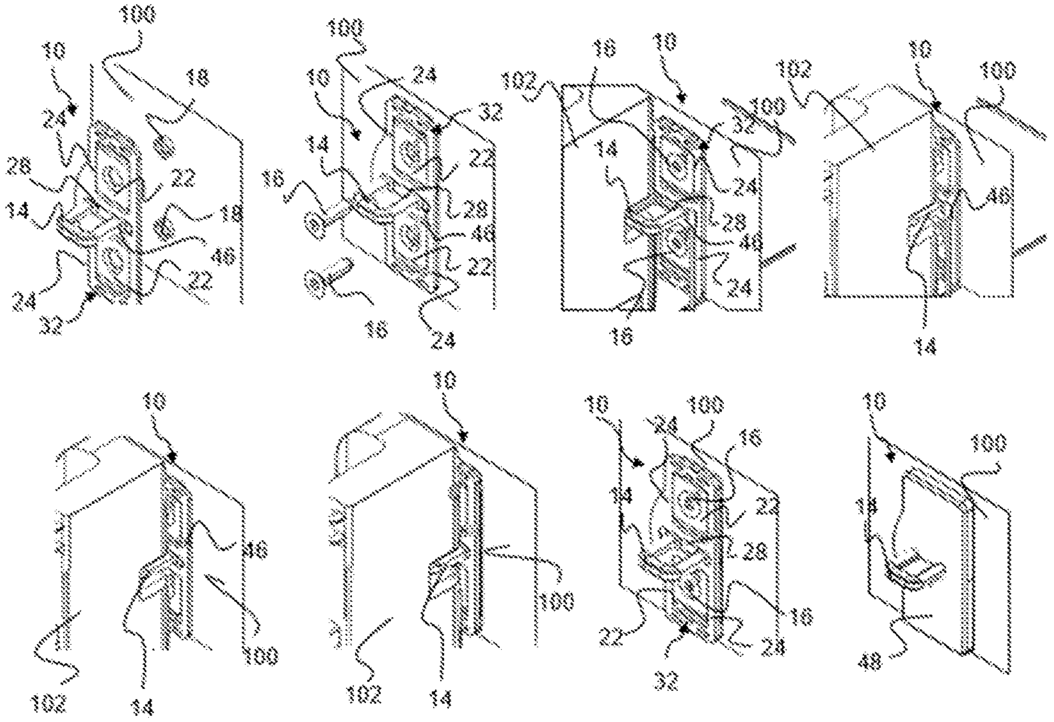
FIG. 3 is a series of perspective views of the striker of FIG. 1, illustrating a method for adjusting the striker according to the teachings of the present disclosure.

More precisely, as illustrated in FIG. 3, during the step a) of securing the striker pad 12 to the vehicle body 100, the spacer 18 can be placed against the vehicle body 100. The striker pad 12 can be placed against the vehicle body, with the spacer 18 inserted in the aperture 20 of the striker pad 12. The first guide 24 can be attached to the striker pad 12. The sleeve 22 can be disposed in the first rail 26, in contact with the striker pad 12 and with the spacer 18. The second guide 28 can be attached to the striker pad 12. The wire 14 can be inserted in the second rail 30. The removable stopper 46 can be placed in the second rail 30. The removable stopper 46 can fill in the extra length of the second rail relative to the wire 14. The securing element 16 can be inserted in the sleeve 22 and the spacer 18, with a first torque value.

During step b) of closing the door 102, the latch cooperates with the wire 14 and moves the striker pad 12 along the first axis A in order to center the wire 14 with the latch. The force exerted by the latch can drive the wire 14 along the first axis A, as illustrated in FIG. 5.

After step b) of closing the door 102, the removable stopper 46 can be removed in order to allow the wire to move inside the second guide 28. During the step b') of pushing on the latch in the direction of closing “f2”, the striker pad 12 can move along the second axis B in order to adjust flushness of the door 102.

After step d) of securing the striker pad 12 to the vehicle body 100 with the second torque value, the cover 48 can be placed against the striker pad 12.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean “at least one of A, at least one of B, and at least one of C.”

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A striker for a vehicle, the striker being configured to be secured to a vehicle body of the vehicle and to cooperate with a latch attached to a door of the vehicle, the door being movable relative to the vehicle body in a direction of closing and a direction of opening, the striker comprising:

a striker pad;

a wire protruding from the striker pad;

a securing element configured to exert a securing force to secure the striker pad to the vehicle body when a torque is applied to the securing element; and a spacer, the spacer being deformable and comprising:

a first end configured to receive the securing force from the securing element; and a second end configured to be in contact with the vehicle body, wherein the spacer is configured to create a clearance between the striker pad and the vehicle body when a first torque value is applied to the securing element so that the striker pad is movable relative to the vehicle body along a first axis perpendicular to the direction of closing through a force exerted by the latch cooperating with the wire when closing the door, and wherein the spacer is configured to be deformed such as to allow contact between the striker pad and the vehicle body when a second torque value higher than the first torque value is applied to the securing element thereby preventing movement of the striker pad relative to the vehicle body, wherein the striker pad defines an aperture and the spacer is disposed in the aperture.

2. The striker according to claim 1, wherein the spacer has a diameter smaller than a diameter of the aperture.

3. The striker according to claim 1, further comprising a sleeve in contact with the striker pad and the spacer, wherein the spacer is configured to receive the securing force via the sleeve.

4. The striker according to claim 1, further comprising a first guide configured to guide movement of the striker pad along the first axis.

5. The striker according to claim 1, further comprising:

a sleeve in contact with the striker pad and the spacer, wherein the spacer is configured to receive the securing force via the sleeve; and a first guide configured to guide movement of the striker pad along the first axis, wherein the first guide comprises a first rail cooperating with the sleeve.

6. The striker according to claim 1, wherein the spacer is configured to permit the striker pad to be movable with respect to the vehicle body along a second axis perpendicular to the first axis through a force exerted on the door in the direction of closing.

7. The striker according to the claim 6, further comprising a second guide configured to guide movement of the striker pad along the second axis.

8. The striker according to claim 7, wherein the second guide comprises a second rail cooperating with the wire.

9. The striker according to claim 6, comprising a return blocking device configured to forbid a return movement of the striker pad along the second axis after movement of the striker pad along the second axis through the force exerted on the door in the direction of closing.

10. The striker according to claim 9, further comprising a reset device configured to cooperate with the return blocking device in order to permit a return movement of the striker pad along the second axis in the direction of opening, after movement of the striker pad along the second axis through the force exerted on the door in the direction of closing.

11. The striker according to claim 6, further comprising a removable stopper configured to block movement of the striker pad along the second axis.

12. A vehicle comprising the striker according to claim 1.

13. A method for adjusting the striker according to claim 1, the method comprising:

securing the striker pad to the vehicle body with the first torque value;

closing the door such that the latch cooperates with the wire and moves the striker pad along the first axis in order to center the wire with the latch;

opening the door; and securing the striker pad to the vehicle body with the second torque value.

14. A method for adjusting the striker according to claim 6, the method comprising:

securing the striker pad to the vehicle body with the first torque value;

closing the door such that the latch cooperates with the wire and moves the striker pad along the first axis in order to center the wire with the latch;

pushing on the latch in the direction of closing such that the striker pad moves along the second axis in order to adjust flushness of the door;

opening the door; and securing the striker pad to the vehicle body with the second torque value.

15. A method for adjusting the striker according to claim 11, the method comprising:

securing the striker pad to the vehicle body with the first torque value;

closing the door such that the latch cooperates with the wire and moves the striker pad along the first axis in order to center the wire with the latch;

removing the removable stopper;

pushing on the latch in the direction of closing such that the striker pad moves along the second axis in order to adjust flushness of the door;

opening the door; and securing the striker pad to the vehicle body with the second torque value.

* * * * *